Inventors
Walter F. Strehlow
Charles T. O'Harrow
Roy W. Johansen
by Kimball S. Wyman
Attorney Sept. 23, 1952 W. F. STREHLOW ET AL 2,611,306
POWER LIFT MEANS AFFORDING DEPTH CONTROL AND SEQUENTIAL
RAISING AND LOWERING OF IMPLEMENTS
Filed June 1, 1948 6 Sheets-Sheet 4

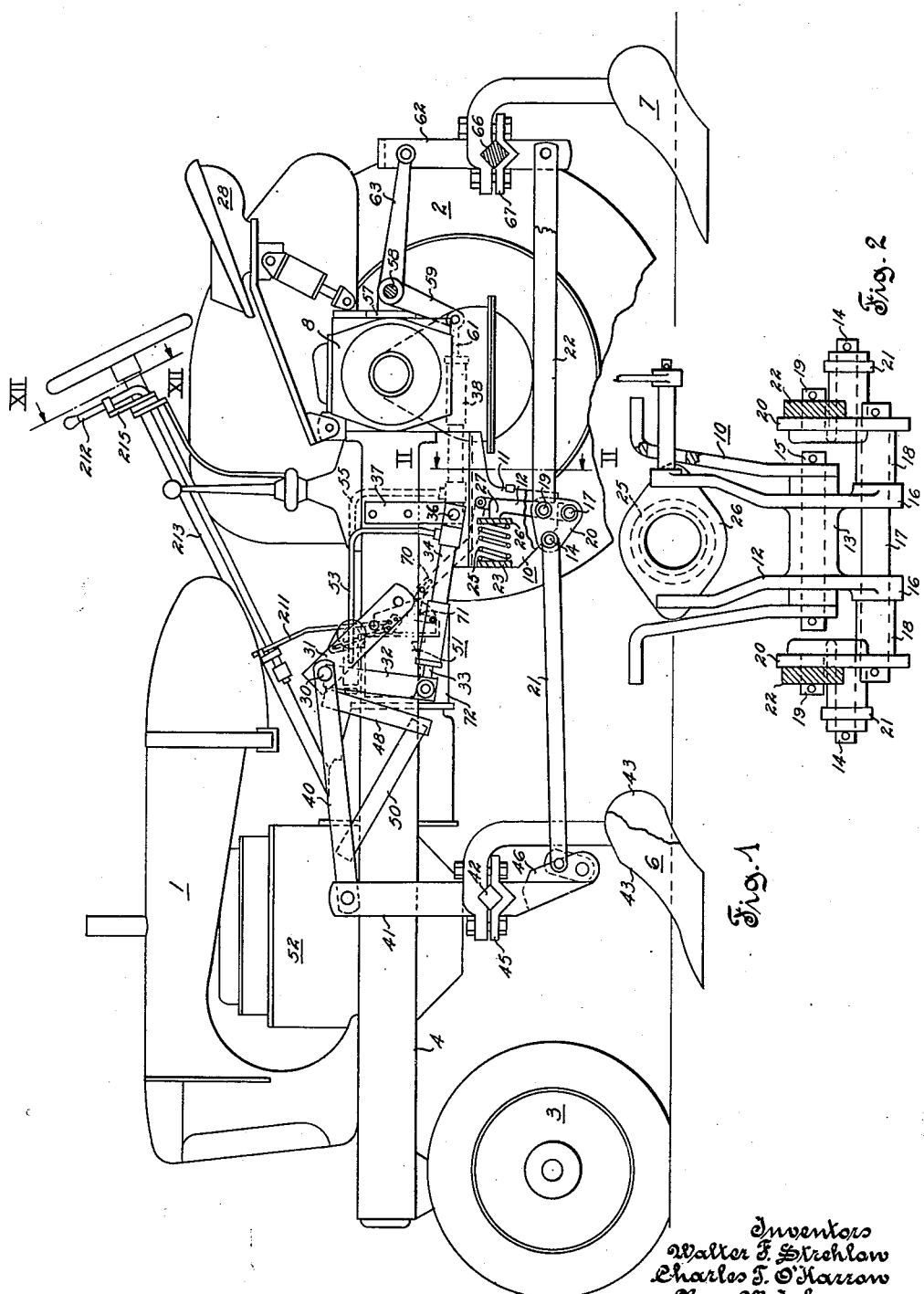

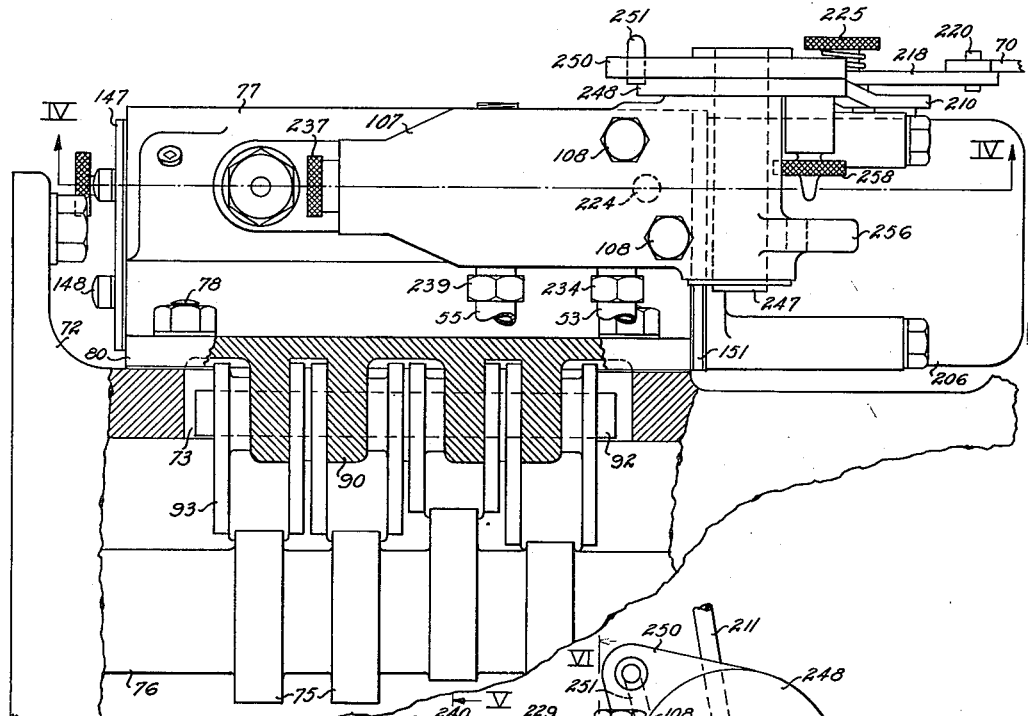
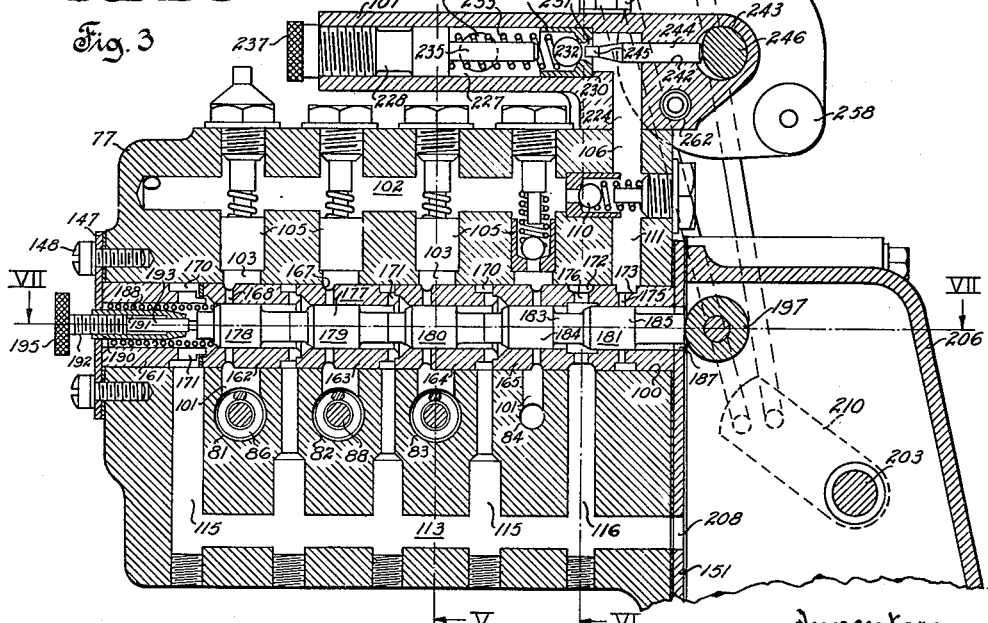

Inventors
Walter F. Strehlow
Charles T. O'Harrow
Roy W. Johansen
by Kimball S. Wyman
Attorney

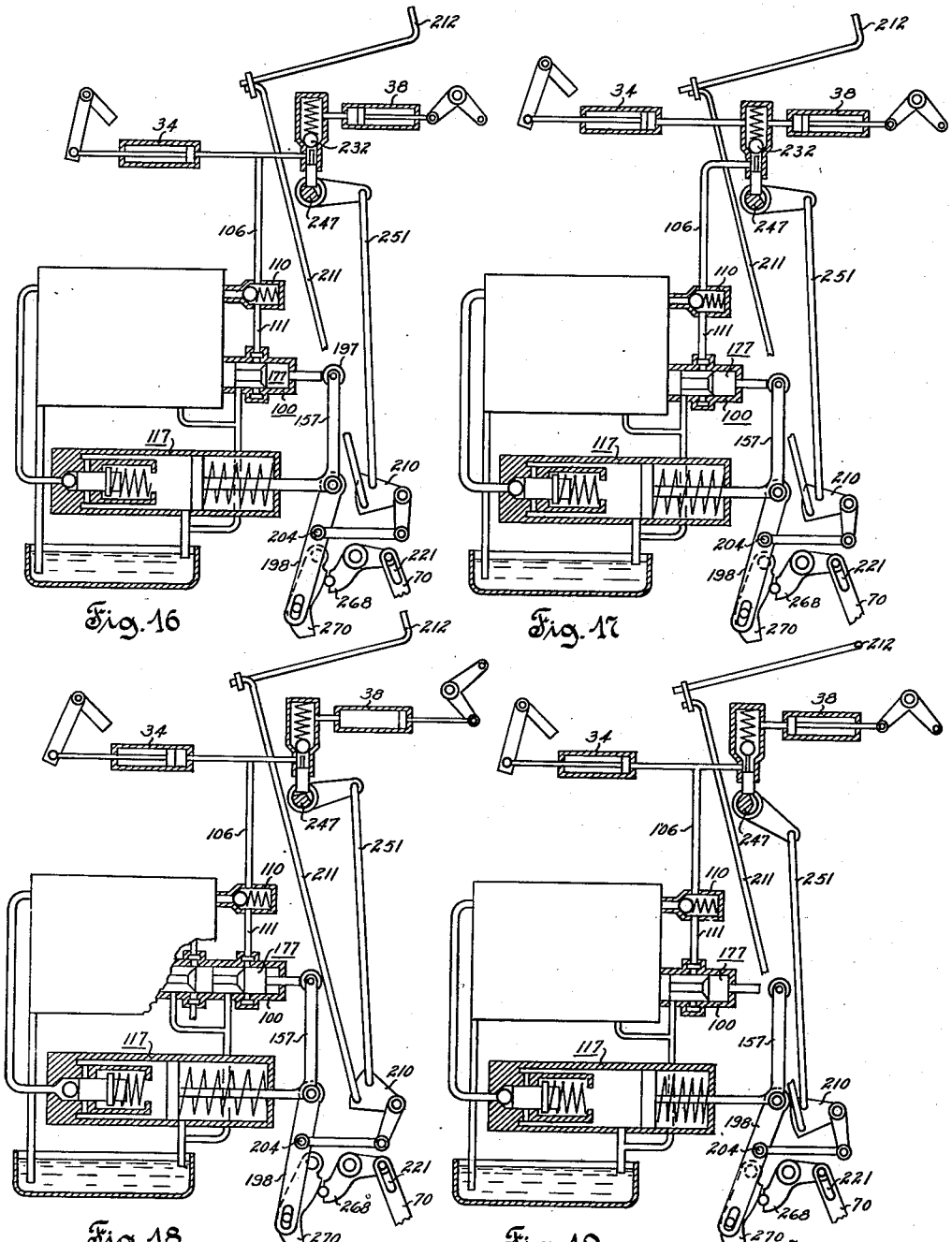

Patented Sept. 23, 1952

2,611,306

UNITED STATES PATENT OFFICE 2,611,306

POWER LIFT MEANS AFFORDING DEPTH CONTROL AND SEQUENTIAL RAISING AND LOWERING OF IMPLEMENTS

Walter F. Strehlow and Charles T. O'Harrow, Wauwatosa, and Roy W. Johansen, West Allis, Wis., assignors to Allis-Chalmers Manufacturing Company, Milwaukee, Wis., a corporation of Delaware Application June 1, 1948, Serial No. 30,348

29 Claims. (Cl. 97—50)

This invention relates generally to apparatus suitable for use in controllably positioning agricultural implements and other devices and is more especially concerned with the provision of a power lift means for tractor propelled implements and/or the provision of apparatus affording particular advantages in connection with the control of the above mentioned and other means combinable with such apparatus.

In the operation of tractor propelled soil working implements, it is often desirable, depending on the nature of the work being performed, to either automatically control the depth of soil penetration or to effect a successive raising and lowering of certain implements, for example, front and rear mounted cultivators. Usually when operating with automatic depth control, if more than one implement is employed, the implements are simultaneously raised and are simultaneously lowered, as required. However, in the cultivation of row crops, rear mounted implements are commonly employed in addition to the usual front mounted implements. Consequently, in the performance of cultivating operations needless work is eliminated if the front and rear mounted implements can be readily controlled to successively raise upon reaching the end of a crop row and to lower successively upon beginning a new row. And while it has heretofore been common to employ apparatus for affording automatic depth control or for affording a sequential raising and lowering of front and rear mounted implements, no prior apparatus is known for readily selectively obtaining either mode of operation, as desired.

Therefore, one of the objects of this invention is to provide an improved implement power lift and control means incorporating features of construction and combination for readily selectively obtaining a sequential raising and lowering of separate implements, or a simultaneous raising and lowering of such implements, or an automatic depth control for soil working implements.

Another object of the present invention is to provide an improved implement power lift and control means wherein a change over from automatic depth control to a control for effecting either a sequential or simultaneous raising and lowering of separate implements can only be accomplished when the lift control means is in its implement lowering position.

Still another object of this invention is to provide an apparatus incorporating parts constructed and combined for coaction and adjustment in an improved manner rendering the movement of a single control lever effective to afford a sequential movement of separate devices controllably connected therewith, or a simultaneous movement of such devices, or automatic depth control of soil working implements, as desired.

Still another object of the present invention is to provide apparatus suitable for controllably positioning agricultural implements and other devices and wherein parts are constructed and combined for coaction in an improved manner affording a sequential movement of separate devices and affording means for readily adjusting the maximum rate of movement and/or the delay interval interposed between successive movements of such devices.

A further object of the present invention is to provide an improved apparatus including parts constructed and combined for ready coaction and adjustment suitable for affording either a sequential or a simultaneous movement of separate devices controllably connected therewith.

Still another object of this invention is to provide a control apparatus incorporating improved features of particular advantage as to the construction, operation and adjustment of parts, and as to the readiness with which devices can be connected or controllably combined therewith.

An additional object of the present invention is to provide a control apparatus for use with agricultural implements and other devices and wherein parts are constructed and combined for coaction in an improved manner all to the end of affording a simplified, readily adjustable apparatus suitable for selectively performing certain operations, including automatic depth regulation of an agricultural implement, with minimum requirements as to time, effort and skill.

The construction and operation of apparatus for accomplishing one or more of the above stated objects will become readily apparent as the disclosure progresses and particularly points out those features, advantages and additional objects afforded by an illustrative apparatus. And accordingly, the present invention may be considered as comprising the various features of construction and/or combination hereinafter more particularly pointed out in the appended claims and in connection with the detailed description of a typical apparatus illustrated by the accompanying drawings, in which:

Fig. 1 is a side elevation of a tractor attached implement combination embodying the invention with the left rear wheel removed to more clearly show the construction involved;

Fig. 2 is a view taken along line II—II of Fig. 1;

Fig. 3 is an enlarged plan view illustrating the manner of attaching the control unit to the tractor housing as indicated in Fig. 1;

Fig. 4 is a vertical section taken along line IV—IV of Fig. 3;

Figure 14:
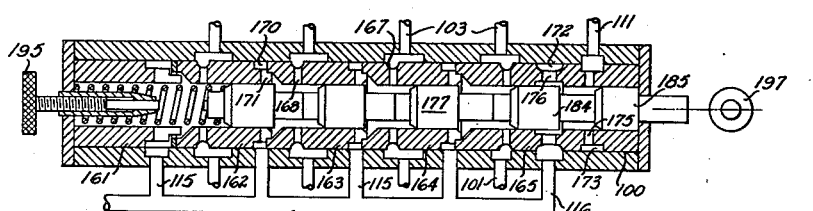
Fig. 14 is a sectional view showing the relation of the main valve to the passages controlled thereby when the valve is in its implement lowering position.
Figure 15:
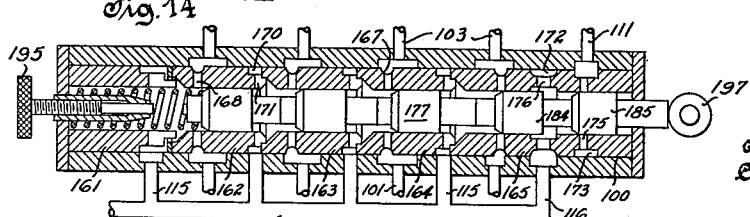

Fig. 15 is a view similar to Fig. 14 showing the valve positioned to hold the implements in a raised or partially raised position with all pumps discharging liquid to the return passage means; and Figs. 16 to 19 are schematic showings of the control system illustrating the function of the hold-positioning valve, Fig. 17 illustrating the system wherein both rams are connected in downstream relation to the hold-positioning valve and Figs. 16, 18 and 19 illustrating the system with a ram connected on either side of the valve.

Referring to Fig. 1 it will be seen that the apparatus chosen to illustrate the present invention comprises generally a tractor 1 having a pair of rear driving wheels 2 and front dirigible wheels 3 supporting a frame 4, and an implement including a pair of front mounted bedders 6 and a rear mounted bedder 7 carried by frame 4.

Mounted forward of and below the rear axle housing 8 is a drawbar support 10 adapted for connecting implements to the tractor in draft transmitting relation therewith. Drawbar support 10 comprises a pair of laterally spaced plate members 11 fixed in depending relation to the under portion of the tractor, as by welding, a bifurcated lever 12 integrally formed with a bearing means 13 adapted for positioning same between plate members 11, and a rod 15 extending through aligned openings in the lower portions of plate members 11 and through bearing portion 13 of lever 12, thereby supporting the lever for swinging movement about rod 15 (see Fig. 2). Lower opposed portions of lever 12 are provided with aligned transverse openings therethrough affording bearing means 16 supporting a pivot pin 17 which in turn rotatably supports a separate bearing means 18 at each end thereof, bearing means 18 supporting triangular plate members 20 which are fixed thereto and which are provided with pairs of oppositely extending aligned pins 14 and 19 affording pivotal supports for the rear and front ends of pairs of draft bars 21 and 22 extending fore and aft therefrom, respectively (note Fig. 2). The upper portion of lever 12 hereinafter called the draft regulating lever, has a spring biasing means acting on it to oppose the draft force applied to the lower end of the regulating lever through triangular plate members 20. This biasing means includes a spring seat 23 rigidly fixed between the upper forward portions of plate members 11 in transverse relation therewith, a compression spring 25 positioned on the seat, and a plate member 26 fixed to the opposite end of the spring for engagement with forwardly projecting portions 27 of the regulating lever. Thus it will be seen that draft force applied to the lower end of regulating lever 12 is opposed by the compressive force of spring 25 acting on the upper end of the lever.

Mounted forward of the operator's station 28 in overlying relation to tractor frame 4 is a transverse lift shaft 30 rotatably supported by strap member 31 fixed to either side of the tractor frame. And while it is apparent that only those parts of the lift mechanism and implement disposed on the left side of the tractor may be seen in Fig. 1, it is to be understood that, when specified, like parts are similarly located on the far side of the tractor. Rigidly fixed to either end of lift shaft 30 in depending relation thereto are lift arms 32, the near lift arm having pivotal connection with the end of piston rod 33 of a ram unit 34 mounted on the left side of tractor frame 4 for vertical swinging movement about a pin 35 carried by a strap member 37 fixed to the side of the frame. A second ram unit 38 is similarly located on the far side of the tractor and will be referred to later on in the description. And in this connection it is to be understood that the ram units may be connected with front and rear mounted implements as shown, or both ram units may be positioned to extend forwardly or rearwardly, as desired, relative to supporting strap members 37.

Pivotally mounted near either end of lift shaft 30 are forwardly extending links 40 each having pivotal connection with the upper end of a tool bar standard 41. These laterally spaced standards carry a tool bar 42 positioned transversely beneath the front of the tractor, to which a pair of bedders 43 are attached by means of clamps 45. At the lower end portion of each standard 41 is rigidly fixed a bracket 46 having pivotal connection with the forward ends of the pair of draft bars 21. The forwardly extending links 40 of the lift mechanism each include a rigidly attached depending arm 48 adapted for edge abutting engagement with lift arm 32, and a brace member 50 rigidly unites a lower portion of depending arm 48 with a forward part of link 40. Thus when ram unit 34 is actuated to extend piston rod 33, lift arms 32 contact arms 48 and swing the forwardly extending links 40, tool bar standards 41 and parts supported thereby in an upward direction. And for supplying fluid to the ram units there is provided a hydraulic pump 51 deriving power from tractor engine 52 in a manner hereinafter more fully disclosed, and a pair of conduits 53 and 55 connecting pump 51 with ram units 34 and 38, respectively.

The rear axle housing 8 of tractor 1 is provided with a pair of laterally spaced plate members 57 mounted on and extending rearwardly therefrom, and a lift shaft 58 is rotatably supported in bearing means (not shown) carried by these plate members. Each end of shaft 58 mounts a bell crank lever which is secured thereto for turning movement therewith, these levers each comprising a depending arm 59 on which the arm on the far side of the tractor is pivotally connected with a rearwardly extending ram unit, in this case the piston rod 61 of ram unit 38, and a rearwardly extending arm 63 having pivotal connection with the upper end of a tool bar standard 62. (The near bell crank lever and tool bar standard have been removed to more clearly show the ram connection.) Tool bar standards 62 have axially aligned trnsverse openings therethrough supportingly receiving a transverse tool bar 66 to which bedder 7 is attached by a clamp 67 or other suitable means. And the rear ends of the pair of draft bars 22 are pivotally secured to opposed inner lower portions of the standards 62. In this connection it will be noted that draft bars 22 for the rear bedder are connected with triangular plate members 20 at a point (pins 19) which, in the position of the parts as shown in Fig. 1, is vertically spaced from the pivot pin 17 a distance twice as large as the vertical distance between the pivot pin 17 and a horizontal plane through the point of connection (pins 14) for front bedder draft bars 21. Therefore, assuming the draft on all bedders is generally equal and proportional to the number of bedders employed, the resulting force on draft regulating lever 12 will be the same for a single rear bedder as it will be for the front two bedders since the effective lever arm for the single rear bedder is twice the effective length of the lever arm for the two front bedders.

At this point it might be noted that draft regulating lever 12 is connected with hydraulic pump 51 through a link 70 having a pivotal connection with the upper end portion of lever 12 and a lost motion (pin and slot) connection with an arm 71 extending from the pump housing. Thus it is apparent that draft bars 21 and 22 are operatively connected with a central arm associated with the pump housing and it will be seen further along in the disclosure how this connection controls the action of the hydraulic unit.

Referring now to Figs. 1 and 3 it will be seen that the hydraulic pump unit 51 is attached to a hollow lubricant confining portion of the tractor drive shaft housing 72. A side wall of the drive shaft housing is provided with an opening therethrough which exposes cam portions 75 on the tractor drive shaft 76, and hydraulic pump and control unit 51 comprising a housing 72 is detachably secured to the side of drive shaft housing 77, as by bolts 78, in covering relation with respect to the opening 73 therethrough. The side of housing 77 opposing opening 73 in drive shaft housing 72 is provided with marginal surfaces 80 for sealingly engaging the side wall surfaces of drive shaft housing 72 which bound opening 73.

Referring also to Figs. 4 to 8, inclusive, it will be apparent that the side of pump housing 77 enclosing opening 73 in hollow structure 72 is provided with four inwardly extending parallel cylindrical chambers 81, 82, 83 and 84, chambers 81 to 83 being of equal diameter and chamber 84 having a materially reduced diameter. A compression spring 86 (see Fig. 5) is positioned within each chamber at the inner end thereof and each chamber includes a pump plunger 87 having a reduced inner end portion 88 disposed in guiding relation within the associated compression spring 86. The opening enclosing side of housing 77 is also provided with outwardly extending projections 90 having aligned holes 91 therethrough receiving and fixedly mounting a shaft or rod part 92 disposed at a right angle with respect to the axes of pump plungers 87 and generally parallel to a plane therethrough. And a plurality of cam followers 93, one for each pump, are pivotally supported on shaft part 92 for swinging movement relative thereto and relative to each other, the lower end portions of these followers 93 being disposed between the outer ends of pump plungers 87 and the opposed cam portions 75 on shaft 76 thereby establishing an operative connection between power driven shaft 76 and pump unit 51 (see Fig. 3).

Pump housing 77 is provided with an intake manifold passage 95 severally communicating with pump chambers 81 to 84 through intake passages 96 and communicating with the lubricant in hollow structure 72 through a main intake passage 97 terminating in the opening enclosing side of housing 77 below the pump plungers therein, passage 97 being provided with a conduit extension 98 (see Fig. 5) which projects outward therefrom through the opening 73 and downward into the fluid confined in hollow casing 72. Housing 77 is also provided with a cylindrical valve chamber 100 which extends therethrough in spaced overlying relation with respect to pump cylinders 81 to 84 and in parallel right angle relation thereto. A plurality of passages 101, one for each pump, severally connect the inner or discharge ends of the pump cylinders with longitudinally spaced portions of cylindrical valve chamber 100. In addition, housing 77 includes a horizontal bore 102 which is disposed above valve chamber 100 in generally parallel relation thereto and which is connected therewith through a group of passages 103 corresponding in number to pump discharge passages 101. And in this connection it should be noted that passages 103 communicate with the valve chamber in diametrically opposed relation to passages 101. Each passage 103 is provided with a spring biased ballcheck valve 105 controlling the flow of fluid therethrough and into bore 102. This bore, which may be considered a manifold space, communicates at its right hand end (note Fig. 4) with an outlet passage 106 for working fluid which terminates inside a valve body 107 secured to the top side of pump housing 77 by bolts 108, or the like, and which affords further control of the flow of liquid to and from one or more pressure actuated devices in a manner to be later described. Communication between outlet passage 106 and manifold space 102 is controlled by a spring biased ball check valve 110 preventing a back flow of fluid from passage 106 into the manifold space. In addition it should be noted that this discharge fluid passage 106 has a branch portion 111 on the discharge side of check valve 110 placing same in communication with the right hand end of cylindrical valve chamber 100.

Figure 5:
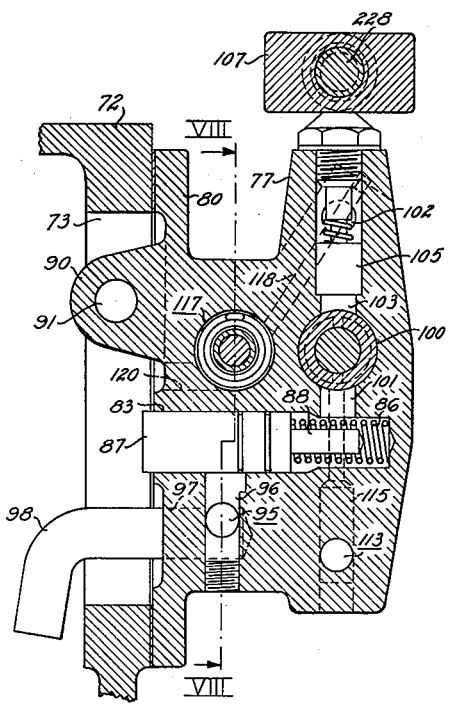
Fig. 5 is a section taken on line V—V of Fig. 4.
Figure 6:
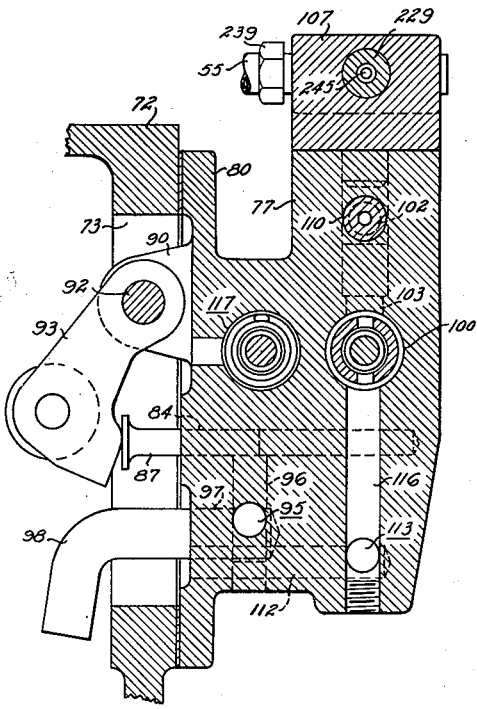
Fig. 6 is a section taken on line VI—VI of Fig. 4.
Figure 8:
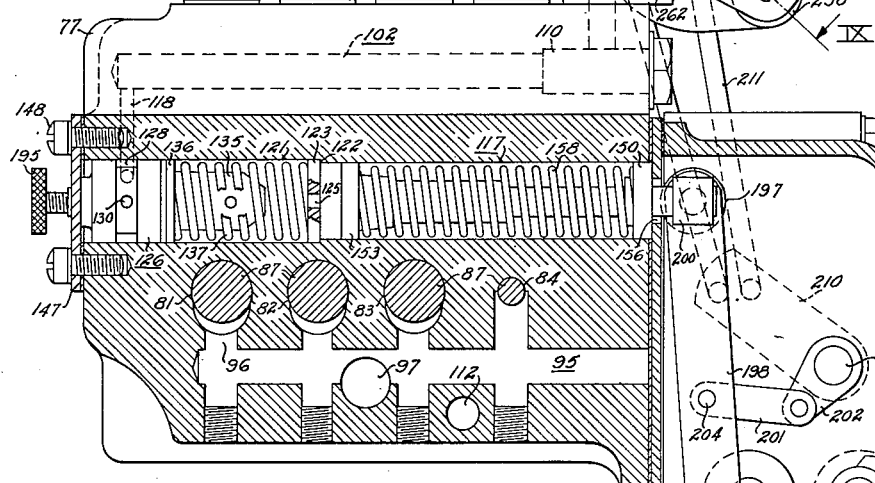
Fig. 8 is a vertical section taken on line VIII—VIII of Fig. 5.

Housing 77 is also provided with a main fluid return passage means comprising a horizontal bore 112 opening through the side surface of the housing closing the opening in hollow casing 72 at a point somewhat below and to one side of intake conduit 97 (Figs. 6 and 8). And the inner end of return passage bore 112 communicates with a bore 113 which is disposed at a right angle thereto (Fig. 6) and which extends nearly through the pump housing in generally parallel relation to and below valve chamber 100. This bore 113 is also disposed somewhat below pump chambers 81 to 84 and a plurality of passages 115 corresponding in number to pump discharge passages 101 place bore 113 in communication with longitudinally spaced portions of cylindrical valve chamber 100, these passages 115 being disposed adjacent the pump cylinder chambers and the passages 101 severally connecting the discharge side of the pumps with longitudinally spaced portions of cylindrical valve chamber 100, as previously described. Another passage 116 places main return passage bore 113 in communication with a right end portion of valve chamber 100 in longitudinally offset diametrically opposed relation with respect to the branch portion 111 of outlet passage 106.

In addition, housing 77 is provided with a cylindrical unloading chamber 117 extending therethrough in laterally spaced parallel relation with respect to cylindrical valve chamber 100 and on a horizontal level therewith. The left hand end of manifold bore 102 communicates with the adjacent end of unloading chamber 117 by means of a passage 118 (Fig. 8) and an intermediate portion of this unloading chamber communicates with a horizontal discharge passage 120 (Figs. 5 and 7) opening through the side surface of the pump housing above the pump chambers therein.

Figure 7:
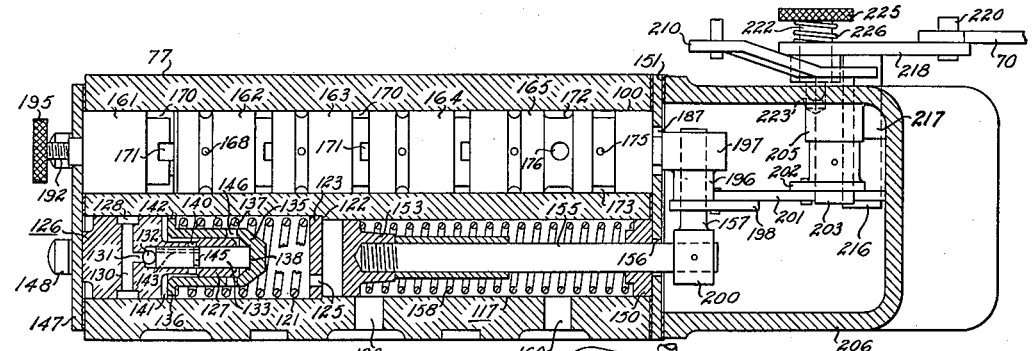
Fig. 7 is a horizontal section taken on line VII—VII of Fig. 4.

The left end portion 121 of unloading chamber 117 is somewhat enlarged to provide an internal shoulder 122 against which is positioned a disk type spring seat 123 having an opening 125 therethrough. The opposite or left hand end of chamber portion 121 is closed by a cylindrical plug element 126 having an inner end portion 127 of reduced diameter projecting axially toward spring seat 123 in spaced relation with respect to the surrounding wall of chamber 117. The left hand end of plug member 126 is provided with a circumferential external groove 128 communicating with passage 118 leading thereto from manifold space 102. A transverse bore 130 connects diametrically opposed portions of groove 128 with a central bore 131 which extends inward from transverse bore 130 and coaxially through the reduced portion 127 of plug member 126. Central bore 131 is enlarged from a point adjacent transverse bore 130 to the discharge side thereof to provide a seat for a ball valve 132 and to receive cylindrical valve element 133. A cylindrical spring seat element 135 slidably surrounds the reduced end portion 127 of plug member 126 and is provided at its open end with a peripheral flange 136 slidably engaging the internal surface of unloading chamber portion 121, this flange also affording a seat for a compression spring 137 disposed between same and disk seat 123. The inner end of element 135 is provided with an internal recess forming a cylindrical seat 138 receiving the inner end of cylindrical valve element 133 which, through the action of spring 137, acts to hold this valve element and ball valve 132 positioned as shown in Fig. 7, that is, with the ball valve firmly engaged with its seat thereby preventing a flow of fluid therepast from manifold 102. And when thus positioned, it will be noted that the flanged end of spring seat element 135 is spaced from the opposed inwardly facing shoulder presented by plug member 126. The reduced portion 127 of plug member 126 is provided with a transverse bore 140 therethrough and is further reduced from its junction with the main portion of the plug member 126 inward to a point beyond transverse bore 140 so as to provide an annular relief passage 141 which communicates with the spring housing portion of chamber 117 through one or more axial slots 142 in the peripheral edge portion of flange 136. Cylindrical valve element 133 is also provided with an axial bore 143 extending from the ball valve end thereof approximately to its midpoint where it communicates with a circumferential groove 145 adapted to place the space between the end of valve element 133 and the seat for ball valve 132 in communication with the transverse bore 140 in plug member portion 127, thus providing a relief passage means for the space surrounding ball valve 132 when seated as shown in Fig. 7. Also, the inner end portion of cylindrical spring seat element 135 is provided with transverse bore 146 therethrough for relief of any liquid accumulating between same and the inner end of plug member reduced portion 127.

The left hand end of unloading chamber 117 and of cylindrical valve chamber 100 are closed by a cover plate 147 secured in end abutting relation to housing 77 by means of cap screws 148 or the like. The right hand end of unloading chamber 117 mounts a cylindrical spring seat 150 and is closed, as is also the corresponding end of valve chamber 100, by means of a cover plate 151 fixedly secured thereto by one or more cap screws 152. A pressure responsive piston 153 is mounted in unloading chamber 117 in down stream relation with respect to spring seat disk 123 and is detachably connected with a movement transmitting rod 155 which extends coaxially through cylindrical spring seat 150 and through an aligned and somewhat enlarged opening 156 in cover plate 151. The outer or exposed end of control rod 155 is fixedly connected with and carries stub shaft 157 which projects at a right angle therefrom in the direction of valve chamber 100 and in generally parallel relation to cover plate 151. A compression spring 158 is interposed between seat 150 and the opposed end of piston 153 in surrounding relation to piston rod 155, this spring acting to move the piston toward the left as viewed in Fig. 7 in closed relation with respect to fluid return passage 120. It will be noted that the right hand end of unloading chamber 117 is provided with another fluid return passage 160 (Fig. 7) opening through the side face of the housing enclosing opening 73, this additional passage functioning to return any liquid which may become trapped between piston 153 and cylindrical spring seat 150.

Referring again to Fig. 4 it will be seen that a cylindrical liner comprising axially separable sections 161 to 165 is disposed in cylindrical valve chamber 100 with innermost section 165, that is, the section adjacent the right hand end of chamber 100, abutting cover plate 151. The opposite end section 161, that is, the section at the left hand end of chamber 100 is held in position by end abutting engagement with cover plate 147. Cylindrical sections 161 to 165 are provided with circumferential external grooves 167 placing pump discharge passages 101 in communication with the check valve controlled passages 103. In addition each section is provided with transverse bores 168 (see also Fig. 7) placing the interior thereof in communication with the diametrically opposed pairs of passages 101 and 103. Furthermore the end abutting portions of cylindrical sections 161 to 165 have parts thereof cut away and shaped to afford circumferential external grooves 170, rectangular in cross section, each of which communicates with the interior of the chamber formed by these sections through diametrically opposed transverse passages 171.

The rectangular external passages 170 formed between end portions of cylindrical liner sections 161 through 165 communicate with passages 115 placing same in communication with the main fluid return passage 113. In addition, the innermost cylindrical section 165 is provided with two additional circumferential external grooves 172 and 173, groove 173 communicating with ram outlet passage 111 and with a transverse bore 175 placing diametrically opposed portions of this groove in communication with the interior of section 165, whereas groove 172 communicates with a passage 116 which in turn communicates with the right hand end of main fluid return passage 113. Groove 172 also communicates with the interior of liner section 165 through diametrically opposed transverse bores 176.

A cylindrical control valve 177 is positioned in the generally cylindrical chamber formed by the end abutting liner sections 161 to 165 and preferably this valve is formed by a series of separable cylindrical elements, 178 to 181, inclusive, disposed in end abutting relation, the end abutting portions of these cylindrical valve elements being reduced to form annular spaces between same and the surrounding internal surfaces of the liner sections. In this connection it should be noted that the right hand or innermost valve element 181 comprises an intermediate reduced portion 183 uniting enlarged cylindrical portions 184 and 185 which in turn terminate in reduced oppositely projecting end portions, the inner one of which abuts the reduced portion on adjacent element 180 and the other of which projects through a coaxial opening 187 in cover plate 151. The valve elements are held in end abutting relation for movement as a unit by means of a compression spring 188 seated on valve element 178 in surrounding relation to the reduced outer end portion thereof with its opposite end abutting the inner surface of cover plate 147. Movement of the valve element to the left as viewed in Fig. 4 may be adjustably limited through the medium of an inwardly projecting part 190 carried by cover member 147, this part having an internally threaded bore 191 extending therethrough in which is adjustably mounted a screw threaded element 192 having a reduced end portion 193 disposed in coaxial abutting relation with respect to a similar projection on the adjacent valve element 178. The outer exposed end of element 192 is provided with a knurled adjusting knob 195.

Referring more particularly to Figs. 7 and 8 it will be noted that the shaft 157 carried by control rod 155 operatively mounts a sleeve having an enlarged portion 197 positioned in opposed engaged relation with respect to the reduced end portion of the innermost valve element 181 which extends through cover plate 151. Shaft 157 is also operatively connected with the upper end of a lever 198, this lever being fixedly secured to sleeve 200 and having an intermediate portion thereof pivotally connected at 204 with a link 201 which in turn is pivotally connected with an arm 202 fixed to an inner end portion of a shaft 203 rotatably supported in a bearing structure 205 carried by control linkage housing 206. This housing is detachably secured in abutting sealed relation against cover plate 151 by means of suitable cap screws 207 or the like. And in this connection it should be noted that cover plate 151 is provided with a suitable opening 208 (note Fig. 4) which is aligned with and places main return passage bore 113 in communication with the interior of the linkage housing. Consequently housing 206 contains oil at a level conforming with that in drive shaft housing 72. The outer end of shaft 203 has a lever arm 210 fixed thereto which in turn is connected through a link 211 (see Fig. 1) with a suitable manually actuatable control lever 212 carried by the tractor steering column 213 and associated with a quadrant 215. The bottom portion of housing 206 contains levers operatively connecting the lower end of lever 198 with the draft regulating link 70 (shown in Figs. 1 and 8). For example, a shaft 216 is rotatably supported in a bearing 217 mounted in the lower portion of housing 206 and has an arm 218 fixed to its outer portion affording connection with draft regulating link 70 through means of a pin 220 carried by the end of arm 218 which slidably engages a slot 221 in the adjacent end of the draft regulating link 70. Arm 218 also carries a lockout screw 222 engageable with an internally threaded bore 223 in the lower portion of housing 206, thereby affording means for securing arm 218 to the side of housing 206 thus rendering shaft 216 immovable. Consequently, regulating link 70 is rendered ineffective to control the position of shaft 216 and may move relative to pin 220 in response to variations in draft force. For readily effecting this locked out relation between arm 218 and regulating link 70 screw 222 is provided with a knurled knob 225 and a spring 226 is positioned between the knob and arm 218 to maintain the screw in any selected position irrespective of vibration.

The inner part of shaft 216 has fixed thereto an arm 268 having a pin 267 projecting transversely with respect to the end of the arm. Another shaft is rotatably mounted in a bearing means carried by housing 206 and fixedly supports on its inner portion a cam lever 270 having a curved edge thereof adapted for engagement by pin 267 on arm 268. The lower portion of cam lever 270 includes a pin and slot connection with the lower portion of lever 198. It should be noted at this point that manual control lever 212 may be moved so as to shift the fulcrum for lever 198, that is the fulcrum 204 afforded by the connection of link 201 to an intermediate portion of lever 198, and thereby moves the top of lever 198 relative to cover plate 151. Also, movement of draft regulating link 70, transmitted through the levers carried by the lower portion of housing 206, causes a swinging movement of lever 198 about the fulcrum point 204. More specifically, spring 158 in unloading chamber 117 is relatively strong as compared with the spring 188 (Fig. 4) acting on control valve 177 and consequently piston 153, control rod 155 and valve 177 tend to assume the positions shown in Figs. 7 and 8. Therefore, the above mentioned position of valve 177, control rod 155 and piston 153 may be changed either (1) by moving manual control lever 212 to effect a shifting of fulcrum 204 in a direction away from cover plate 151 and thus pivot lever 198 about its lower end, or (2) by a movement of draft regulating link 70 away from pump housing 206 causing pin 267 to engage cam lever 270 and thus swing lever 198 in a clockwise direction (as viewed in Fig. 8) about its fulcrum 204. Either of these actions moves rod 155 and piston 153 toward the right as viewed in Fig. 8 which in turn compresses spring 158. As a result of such movement, spring 188 urges control valve 177 toward the right (note Fig. 7) and acts to maintain the reduced right hand end of this valve in engagement with roller 197. Movement of the valve in the direction just described, that is toward the right, is limited by engagement of the enlarged portion 185 (Fig. 4) of valve element 181 with cover plate 151.

Referring now to Figs. 3 and 4 it will be seen that the valve body 107 includes a passage 224 forming a continuation of outlet passage 106 in housing 77 as previously mentioned, passage 224 merging with a passage 227 which extends at a right angle thereto and longitudinally through the valve body. The opposite or left end of passage 227 is closed by a cylindrical plug element 228. And the portion of this passage merging with passage 224 is of reduced diameter to provide an internal shoulder 230 against which is positioned a cylindrical seat 229 having an opening 231 therethrough controlled by a ball valve element 232. A spring 233 is positioned between ball element 232 and the inner face of plug element 228 for urging ball 232 against its seat, plug 228 preferably including a reduced inner end portion 235 extending within and acting as a guide for spring 233. Furthermore, plug 228 is in screw threaded engagement with the outer or left end portion of the bore or passage 227 and may be provided with a knurled knob 237 affording ready axial adjustment thereof. Consequently the compressive force of the spring 233 acting on ball valve 232 may be varied from substantially zero to the maximum afforded by the spring, as desired. And looking at Figs. 8 and 9 it will be noted that valve body 107 also includes a transverse bore 238 communicating with the passage 224 this being located at the right or upstream side of valve 232, and two additional transverse passages 240 and 241 communicating with passage 227 on the left or downstream side of ball check valve 232. These three transverse passages all project outwardly through valve body 107 and passages 238 and 241 are provided with suitable connectors 234 and 239 for coupling ram hose 53 and 55 or the like thereto (passage 240 having a plug therein). Thus it will be obvious that ball valve 232 controls the flow of liquid to and from ram outlet passages 240 and 241, but not ram outlet passage 238. And it will also be obvious that through adjustment of element 228 valve 232 may be made to open under varying pressures as previously mentioned.

Although spring biased valve 232 controls the flow of liquid to passages 240 and 241, an additional means is afforded to unseat the ball element and allow the return of fluid from these passages to the reservoir through passages 224, 106, 111, groove 173, transverse bores 175, valve chamber 100, and return passage 116. To accomplish such regulation, valve body 107 is provided with a reduced bore 242 which is coaxial with passage 227 and the opening 231 in valve seat 229, this reduced bore merging with the upper end of passage 224 and with a right angle bore 243 which extends transversely through valve body 107. A ball valve unseating stem 244 is slidably mounted in bore 242 and is provided with a reduced end portion 245 adapted to be moved through the opening 231 in valve seat 229, the opposite end of this stem being seated in an opposed groove afforded by a reduced cam portion 246 of a transverse cylindrical shaft 247 rotatably mounted in bore 243 (note Figs. 4 and 9). Shaft 247 carries on its outer end (that is, the top end as viewed in Fig. 9) an inner arm 248 fixed thereto for movement therewith. An outer arm 250 is mounted adjacent arm 248 on a bearing forming hub portion 249 thereof for rotation relative thereto and is operably connected with arm 210 (note Fig. 8) carried by pump control linkage housing 206 through a rod 251 or the like. An internally threaded part 252 is carried by inner arm 248 in radially spaced relation to the hub portion 249 thereof, this part projecting inwardly from arm 248 in generally parallel relation with cylindrical shaft 247 and being provided with a lockout screw 253 adjustable axially thereof. Outer arm 250 is provided with a hole 255 therethrough adapted for alignment with lockout screw 253 to receive the adjacent end portion of same thereby locking arms 248 and 250 together for simultaneous movement.

Figure 9:
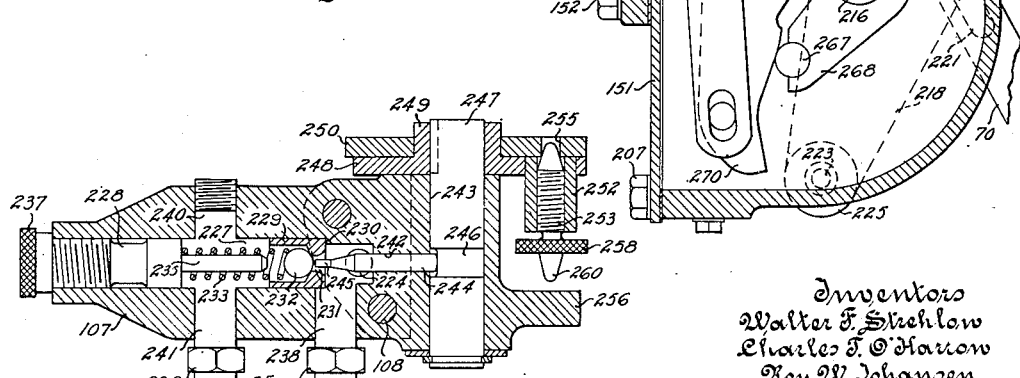
Fig. 9 is a section taken along line IX—IX of Fig. 8.

Referring particularly to Fig. 9 it will be seen that the near end portion of valve body 107 is provided with a lug 256 projecting rearwardly therefrom in spaced opposed parallel relation to arms 248 and 250, this lug having a hole 257 therethrough adapted for alignment with lockout screw 253. In this connection it should be noted that lockout screw 253 has a knurled knob 258 and includes a reduced end portion 260 extending toward lug 256, this reduced portion being adapted for insertion in hole 257 when positioned opposite same. A safety feature is provided in this respect in that lockout screw 253 is somewhat longer than the distance between outer arm 250 and lug 256 and therefore in order to back screw 253 out of the hole 255 thereby freeing outer arm 250 it is necessary that hole 257 in lug 256 be aligned with the reduced end portion 260 of screw 253. And, since this last mentioned alignment of parts is only possible when the manual control lever 212 has been moved to its full lowering position ("D" on Fig. 12 wherein all pumps are discharging back to the reservoir, the ram relief passage 111 is in communication with return passage 116 and the shaft 246 has actuated stem 244 to unseat ball valve 232 thereby draining the liquid from the ram units controlled thereby), there is no danger of an operator being injured by the sudden dropping of an implement.

Figure 11:
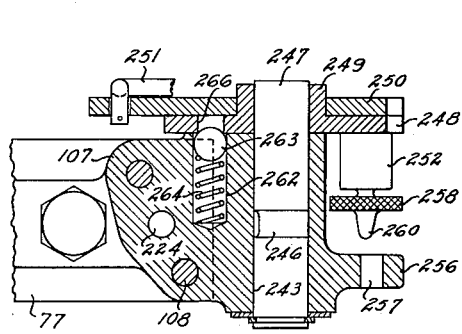
Fig. 11 is a section taken on line XI—XI of Fig. 10.
Figure 10:
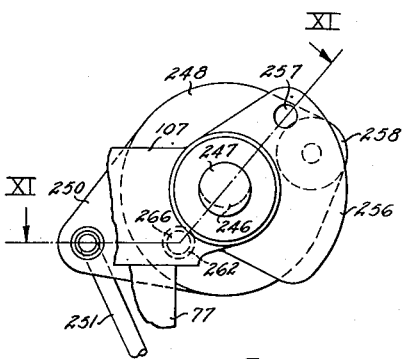
Fig. 10 is a side elevation of part of a valve housing and associated control parts shown in Fig. 8, the control parts in Fig. 10 having been moved to an implement lowering position.

Referring to Fig. 11 it will be noticed that valve body 107 has a transverse bore 262 which is disposed in adjacent forward relation with respect to cylindrical shaft 247 and which includes a ball 263 and a compression spring 264 seated within bore 262 for urging ball 263 against inner arm 248. Arm 248 includes an oblong recessed portion or detent 266 adapted for alignment with ball 263 to afford a position indicating means whereby the operator in moving control lever 212 downwardly can detect the movement of ball 263 into detent 266 and thereby know through the force reaction to a further movement of lever 212 that the control valve 177 is in the lowering position (shown in Figs. 14, 16 and 17) with ram outlet passage 106 communicating with return passage 116 and that ball check 232 is still seated to prevent the draining of liquid from the rams on the downstream side thereof. A further downward movement of control lever 212 will then cause ball check 232 to be unseated thereby permitting a return flow of liquid therepast to lower the implements actuated by the downstream ram units.

Figure 12:
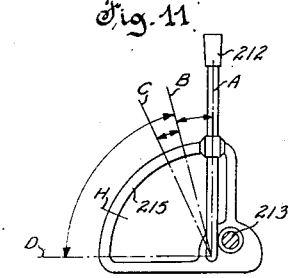
Fig. 12 is a view taken along line XII—XII of Fig. 1.
Figure 13:
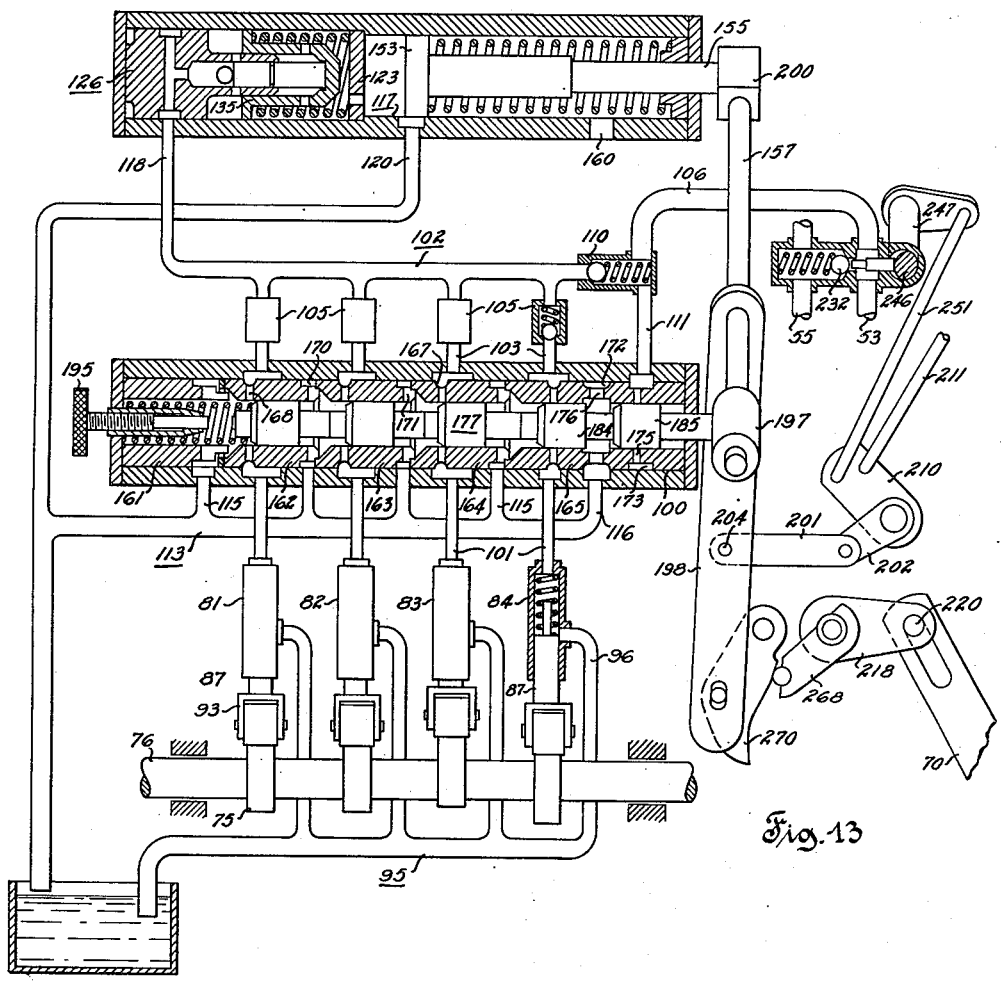
Fig. 13 is a schematic illustration of the control system with some parts shown in section to afford a better understanding of its operation.

When operating with the parts positioned to obtain maximum lifting effect, that is, assuming hand lever has been shifted to its full lift position shown in Figs. 1 and 12 to thereby quickly raise the implements and that the linkages and valve parts are positioned as shown in Figs. 4, 8, and 9, it will be noted that the enlarged cylindrical portions of the valve elements 178 to 181, inclusive, close transverse bores 168 and that, therefore, the pumps are severally connected with manifold space 102 through passages 101, external grooves 167, and through check valve controlled passages 103. The liquid entering manifold space 102, assuming the liquid has been drained from all ram units, flows therefrom through check valve controlled passage 106 and into valve chamber 224 from which it flows through conduit 53 to ram unit 34, the liquid quickly attaining a pressure sufficient to rapidly expand ram unit 34 and thereby fully raise the front mounted implement. In this connection, it should be understood that spring 233 has been sufficiently preloaded by turning adjusting screw 237 to retain valve 232 closed until ram unit 34 has completed its expansion stroke. As the pressure of the liquid continues to increase, valve 232 opens which admits pressure liquid into valve chamber space 227 from which it flows through passage 241 and conduit 55 to the ram unit 38, the latter rapidly expanding, thereby quickly raising the rear mounted implement to its fully lifted position. When this occurs the pressure of the liquid continues to increase until a pressure is attained which is sufficient to unseat pressure relief ball valve 132 whereupon the check valve assembly comprising ball valve 132 and cylindrical valve element 133 moves toward the right, compressing spring 137 until valve element 133 opens transverse pressure relief bore 140. As a result, pressure liquid flows into annular space 141, then through the axial passages 142 in the periphery of flange portion 136 of spring seat element 135, then into the spring housing chamber from which it flows through the opening 125 in disk spring seat 123, and then into the space between this seat and the head of piston 153. This pressure liquid then acts on piston 153 and moves same toward the right thereby opening relief passage 120, which is in communication with the source of oil in hollow structure 72 and in linkage housing 206. This movement of piston 153 results in a movement of control rod 155 toward the right sufficient to bring the lower end of lever 198 into engagement with the side of cover plate 151 which engagement limits the movement of the piston 153 and control rod 155 in this direction. As a result spring 188 causes control valve 177 to move to the right in following engaged relation to sleeve part 197 and to the position indicated in Fig. 13. In this, the pump unloading position, the enlarged portions of valve elements 178—181, inclusive, place transverse bores 171 in the associated liners in communication with return passages 115 thereby severally connecting the discharge sides of pumps 81, 82 and 83 in communication with the main return passage 113. However, it should be noted that the enlarged portions 184 and 185 of valve element 181 remain in closed relation with respect to transverse bores 168 and 175, respectively, and therefore pump 84 continues to deliver liquid through circumferential groove 167 into manifold space 102 through the associated check valve controlled passage 103.

It should be noted that the end area of cylindrical relief valve element 133 is considerably greater than the area of the passage controlled by ball valve 132 and that consequently it requires a relatively high pressure to effect an initial opening movement of these two valve parts. However, once an opening relation is established, the increase in effective area afforded by cylindrical relief valve element 133 operates to maintain the relief passage means open under a considerably reduced pressure head. Therefore, in the position just described, that is, the unloading position of main control valve 177, the three plungers in chambers 81, 82 and 83 are delivering liquid to the return passage means 113 whereas only one plunger, the one in chamber 84, is delivering liquid to manifold space 102 and this liquid, assuming there is no appreciable leakage from the ram circuit, returns to the source through the relief passage means comprising passage 118, bores 130 and 131 in plug element 126, relief valve elements 132 and 133, transverse bore 140 in plug element reduced portion 127, passages 141 and 142, the opening 125 through disk spring seat 123, and passage 120. In this connection it may be well to note at this time that although the enlarged cylindrical flow controlling portions of valve 177 are of substantially equal axial length, the reduced portions are of different axial lengths and in addition the axial spacing of the circumferential grooves 167, 170, 172 and 173 and of the transverse bores or passages 168, 171, 175, and 176 connected therewith vary somewhat as to their axial spacing so as to afford the above mentioned regulation in response to an unloading movement of the control valve.

In the absence of excessive leakage, more particularly leakage through the flexible hoses and the connections between such hoses and the ram cylinders and valve body 107, main control valve 177 will remain in its unloading position until the fulcrum 204 of lever 198 is shifted by actuation of manual control lever 212. However, if for any reason the pressure in manifold space 102 should decrease below that necessary to hold ball valve 132 and cylindrical relief valve element 133 in their passage opening positions (note Fig. 13) these valve elements will close the relief passage means 118 and as the liquid drains from the space ahead of piston 153, spring 158 will move piston 153 and control rod 155 to the left thus repositioning the main valve 177 to connect all pumps to manifold space 102, this initial position of main control valve 177 being determined, as previously indicated, by the position of manual control lever 212. In this connection, it should be noted that the relief valve means (elements 132 and 133) will open whenever the pressure in manifold space 102 attains a predetermined high value and that such opening movement will result in the main valve 177 moving to its unloading position unless the position of hand lever 212 is such that only the plunger in chamber 84 is delivering liquid to manifold space 102.

Referring again to Figs. 7, 8, 9 and 11, it will be noted that the parts 248 and 250 carried by cam shaft 247 of the hold-position valve structure are locked together for simultaneous movement in response to movements of hand lever 212. In addition, it should be noted that the shaft 216 in linkage housing 206 is locked against movement by engagement of screw 222 carried by arm 218 with the internally threaded bore 223 adjacent the lower end of this housing. Consequently, all that has to be done in the event it is desired to successively lower the implements is to first shift hand lever 212 to any selected position within its lowering range B—C which in turn shifts the fulcrum 204 of lever 198 away from cover plate 151 a distance sufficient to permit spring 188 to move main control valve 177 to the right until the discharge sides of all pumps and the ram relief passage means 111 are in communication with return passages 115 and 116, respectively, these return passages being in continuous communication with the main return passage 113. When the main valve is thus positioned, assuming lever 212 is closely adjacent point C on quadrant 215, liquid rapidly drains from ram unit 34 connected with the front mounted implement, the ram piston moving to its retracted position through gravity action of the implement thereby dropping the implement onto the ground. As soon as the front mounted implement reaches the ground, or later if desired, hand lever 212 is then moved toward point D on quadrant 215 a distance sufficient to unseat valve 232 thus permitting the liquid to drain from ram unit 38. If it is desired to gradually lower the front mounted implement, or in fact any implement actuated by a ram unit connected in upstream relation to valve 232, such action can be readily accomplished simply by shifting lever 212 to a position closely adjacent point B on quadrant 215, that is to a position such that main valve 177 barely opens passage means 175 placing the ram relief passage 111 in communication with return passage means 116 and 113. And if in this connection it is desired to place all pumps in communication with return passage means 113 through passages 115 and yet hold the front mounted implement in its fully raised position or in a selected partially raised position, this can be readily done by shifting lever 212 to point B on quadrant 215 which in turn shifts the fulcrum 204 of lever 198 so as to position main control valve 177 as indicated in Fig. 15. When thus positioned, it will be noted that the enlarged portion 185 of cylindrical valve section 181 closes the transverse bore 175 to prevent placing ram relief passage 111 in communication with return passage means 116 and 113.

It should be obvious that in addition to the various positions of the main control valve 177 just described, this valve may also be positioned by a manual shifting of the fulcrum 204 for lever 198 so as to effect a ram expanding action by connecting the discharge sides of one or more pumps with the check valve controlled passages 103 connecting same with manifold space 102. In this connection, it may be well to note at this time that whenever hand lever 212 is within the range A—B on quadrant 215, one or more pumps, depending on the selected position of the lever and the position of limiting screw 195, are delivering liquid to manifold space 102, that whenever lever 212 is on point B all pumps are delivering to the return passages 115 and the ram relief passage 111 is closed by the enlarged cylindrical portion 185 of valve 181, that whenever lever 212 is within the range B—C on quadrant 215, all pumps are delivering liquid to the return passages 115 and the ram relief passage 111 is in communication with return passage 116 (the extent of such communication increasing as the lever moves from adjacent point B toward point C), that as lever 212 is moved from C to D, the enlarged sleeve portion 197 on stub shaft 157 carried by control rod 155 moves away from the adjacent end of valve 177 and toward the limiting position shown in Fig. 14, and that in moving from C to D lever 212 overrides spring pressed ball detent 266, this detent affording a force reaction on lever 212 definitely indicating when it reaches position H on quadrant 215. When lever 212 is in position H, the front mounted implement will rapidly lower, but a further movement of lever 212 toward point D is necessary to unseat ball valve 232 and thereby effect a rapid lowering movement of the rear mounted implement, that is a rapid contraction of ram unit 38.

As previously described in connection with the lifting of the implements, it was assumed that valve 232 was adjustably biased to afford successive operation of the ram units, this adjustment being such that a pressure sufficient to operate ram unit 38 is attained only after ram unit 34 has completed or nearly completed its power stroke. However, it may be desirable to obtain a simultaneous raising of ram units connected as shown in Fig. 16 and this can be readily done simply by adjusting biasing means 237 so that valve 229 functions merely as a one way valve which opens prior to any expanding movement of ram unit 38. When valve 232 is thus conditioned, both front and rear implements will raise simultaneously assuming that they are of equal weight, that the lift linkages transmit equal loads to the ram units, and that the ram units are identical. However, while the ram units are usually identical, the lift linkages and implement weights are often different, but such differences can be readily offset or compensated for by suitably turning plug 228 to adjust biasing spring 227. This is an important feature for the reason just stated and for the further reasons that it affords means for varying the time delay interval between the successive raising of different implements and that it enables an effective automatic unloading of the pump means in response to obtainment of a predetermined pressure in manifold space 102.

Another important feature previously described is that main control valve 177 may be selectively positioned through actuation of hand lever 212 to a position wherein all ram units on the upstream side of hold-position valve 232 may be held (note Figs. 15 and 18) in a fully or partially raised position, as desired. However, this control position is rather critical with the particular main valve and the associated passage arrangement herein described. And while the axial dimensions of the main valve sections and the arrangement of the passages associated therewith could be readily varied to render such positioning of the main control valve less critical and/or to obtain overlapping control of certain passages, as desired, it is preferable in the interest of selectively obtaining either automatic draft regulation or increment adjustment of implement position to correlate the main valve and passages controlled thereby so as to either open or close the radially extending transverse bores or passages 168, 171 and 176, placing the circumferential grooves 167, 170 and 172 in communication with the interior of the valve chamber formed by liner sections 161–165, inclusive, and to employ the supplementing hold-position valve structure 107. This combination is of considerable importance in that it affords effective draft regulation over an extremely wide range and yet enables the operator to readily hold any implements actuated by ram units on the downstream side of valve 232 in any selected position.

Referring particularly to Figs. 16–19, inclusive, it will be noted that in Fig. 16, main valve 177 is in a lowering position corresponding to a setting of hand lever 212 on point C of quadrant 215 since the enlarged sleeve portion 197 on shaft 157 carried by control rod 155 is in engagement with the adjacent end of the main valve, this setting of the hand lever having been effected after complete contraction of ram unit 34 and after a partial contraction of ram unit 38. In other words, hand lever 212 may have been initially positioned at point H on quadrant 215 and then moved to the position shown in Fig. 19, the latter being followed by a movement of the hand lever to a position permitting valve 232 to close and thereby hold ram unit 38 in the selected partially lowered position shown in Fig. 16. As previously indicated, the position of hand lever 212 within the range A—B determines the number of pumps delivering liquid to manifold space 102 and therefore the rate at which the ram units expand and raise the implements connected therewith. Similarly, the position of hand lever 212 within the range B—C determines the extent of communication between passage means 111 and 116 and therefore the rate at which ram unit 34 is lowered.

Fig. 17 is similar to Fig. 16 with the exception that both ram units are connected to the source of liquid in downstream relation to valve 232. That is, the ram units are connected for communication with the passages 240 and 241 (Fig. 9), respectively, and passage 238 on the upstream side of valve 232 is blocked by a plug (not shown) or other suitable means. Consequently both ram units are simultaneously raised, lowered or held in a selected position, as desired, simply by positioning hand lever 212 in range A—B, range H—D, or range B—H, respectively. And it should be apparent that the position of hand lever 212 within range A—B determines the rate of ram unit expansion and thereby the rate at which an implement is raised relative to the ground. In addition, both implements can be lowered in increments or slowly, as desired, since the lever controlled cam actuated stem 244 for unseating valve 232 can be moved to effect a gradual unseating of this valve.

Fig. 18 shows ram connections identical to those appearing in Fig. 16, but with the main valve 177 in a position corresponding to a setting of hand lever 212 on point B of quadrant 215. In this position, all pumps are delivering liquid to the return passage means and the ram draining passage means 173 and 175 is closed by the enlarged cylindrical portion 185 of the main valve, this positioning of the hand lever 212, main valve 177 and ram unit 34 having been effected after first moving the hand lever to a lowering position within range B—H and then shifting it to the position shown so as to hold the ram unit in a partially contracted position.

Fig. 19 shows ram connections identical to those appearing in Figs. 16 and 18, but with the main valve in a position corresponding to a setting of hand lever 212 on point D of quadrant 215. In other words, this positioning of the hand lever and main valve is for effecting a lowering movement of any ram unit connected in downstream relation to valve 232. And the rate at which such ram units are lowered and also the extent of lowering are obviously controlled by suitably positioning the hand lever within the range H—D on quadrant 215 and the interval during which the lever is allowed to remain in the position selected.

It should now be obvious that the valves 177 and 232 are constructed and combined for coaction in a manner affording simultaneous or successive raising and lowering of ram units connected therewith and affording means whereby ram units may be connected in upstream and/or downstream relation to the valve 232, the ram units when thus connected being further controllable to vary the rate of movement thereof to selectively position and hold same, as desired, and/or to effect increment adjustment thereof. This is another important feature in that it renders the system applicable to all types of implements irrespective of their relative weights and irrespective of the particular linkage arrangement employed for lifting and lowering the implements. Still another important feature is the coaction of the camshaft actuating parts carried thereby, particular reference being had to the means for selectively connecting such parts so as to render a movement of hand lever 212 effective to turn camshaft 247 and thereby control the unseating of ball valve 232. In this connection it will be noted, reference being had to Figs. 3, 8 and 9, that arms 248 and 259 can be locked together or disengaged only when hand lever 212 is positioned at point D on quadrant 215 as pointed out previously in the description. And when lever 212 is at point D all implements are resting on the ground thereby eliminating any possibility of injury to an operator resulting from the dropping of an implement when such adjustments are being made.

The operation thus far described has assumed that draft lockout screw 222 is positioned to hold the shaft 216 in linkage housing 206 in the fixed position shown in Fig. 8. Consequently, variations in the draft induced force on pivoted drawbar support 10 has no effect whatever on the control of main valve 177 by the actuation of hand lever 212. However, as previously suggested the system is also capable of affording automatic draft regulation and all that has to be done in order to obtain such operation, as distinguished from the lift, lower and hold regulation previously described, is to position hand lever 212 on point D of quadrant 215, then turn screw element 253 to withdraw one end thereof from the aligned holes in part 250 (the opposite end of this element moves into the aligned hole 251 in fixed flange 256), and then withdraw lockout screw 222 from the threaded bore 223 in linkage housing 206 thereby permitting shaft 216 to respond to movements of levers 268 and 270 effected by the action of control rod 155 connected with the upper end of lever 198. With the parts thus positioned it should now be apparent that camshaft 247 associated with valve 232 remains locked in fixed position, that hand lever 212 may be shifted to selectively position main valve 177, as desired, and that draft link 70 moves forward (note Fig. 1) in a direction tending to separate the left hand end of the slot 221 therein from the associated pin 220 on arm 218 fixed to shaft 216.

If it now be assumed that instead of lever 212 being in the lift position shown in Fig. 1, this lever after having been shifted to point D on quadrant 215 in order to condition the system for draft regulation as just described, is then moved to some intermediate position within the range B—D, it should be apparent that lever 193 will assume a generally stable position wherein the draft induced force balances the lift force produced by the pumps. For example, a shift of hand lever 212 from point D on quadrant 215 to a position within the lowering range B—D results in a shifting of the fulcrum 204 of lever 198 from its limiting position (see Fig. 8), back toward cover plate 151 thereby causing sleeve portion 197 to approach or contact the adjacent end of main valve 177, this movement of hand lever 212 effecting a counterclockwise pivotal movement of lever 198 about the lower end thereof which is joined to cam lower 270 by a pin and slot connection. As the implements enter the ground, draft force is transmitted to the lower end of drawbar support 10 through draft members 21 and 22, this draft force increasing as the tools (bedders in this case) go deeper into the ground. Consequently, lever 12 pivots against the resistance afforded by spring 25 thereby moving draft regulating link 70 forward so that the left hand end of the slot 221 thereon tends to move away from pin 220 on arm 218. However, since the pin 267 on arm 268 is in engagement with the lower position of lever 198 through lever 270, and the shaft 216 mounting arms 218 and 268 is now free to turn in a counterclockwise direction as viewed in Fig. 8, the spring 158 surrounding control rod 155, which is stronger than valve spring 188, causes lever 198 to pivot in a counterclockwise direction about its fulcrum 204. Therefore, this movement of lever 198 operates to bring the enlarged sleeve portion 197 on shaft 157 into engagement with the adjacent end of valve 177 thereby moving same to the left and into an implement raising position, the extent of such movement depending on the position of fulcrum 204 as determined by the selected position of hand lever 212. As the implements lift due to one or more pumps delivering liquid to the ram units 34 and 38, the draft force transmitted to lever 12 decreases and as a result spring 25 will move link 70 rearwardly thereby turning shaft 216 and the arm 218 thereon in a clockwise direction which in turn effects a similar movement of lever 198 about its fulcrum 204. And it should now be obvious that this resulting clockwise movement of lever 198 permits spring 188 to move valve 177 to an implement lowering position conforming with the decrease in draft force and the position of hand lever 212.

The above described automatic draft regulation has assumed that the type and condition of the soil are substantially uniform throughout the field being worked. However, should the type and/or condition of the soil vary materially and it is desirable to maintain a uniform depth of soil penetration, a manipulation of hand lever 212 is necessary. For example, if the soil becomes heavier, hand lever 212 should be shifted toward point D on quadrant 215 thus moving fulcrum 204 further toward the right as viewed in Fig. 8, whereas if the soil becomes lighter, lever 212 should be shifted toward point B. As previously indicated, movement of hand lever 212 past point C and toward point D on quadrant 215 operates to merely move shaft 157 and sleeve portion 197 (attached to the upper end of lever 198) away from the adjacent end of valve 177 and toward the extreme position indicated in Fig. 14, valve 177 being prevented from following sleeve portion 197 by engagement of its enlarged portion 185 with the inner side of cover plate 151. Consequently, if hand lever 212 be positioned between points C—D, the draft force necessary to bring sleeve portion 197 into operative engagement with the adjacent end of valve 177 is determined and varied in accordance with the selected position of this lever. This is an important feature in that it affords an effective range of draft regulation without necessitating a preloading of the spring 25 which acts on lever 12 in opposition to the draft induced force thereon. However, if desired, spring 25 may be preloaded thereby increasing the effective range of draft regulation to include all positions of lever 212 within the range B—D.

When it is desired to dispense with draft regulation and utilize the system to lift, lower or hold one or more implements, as desired, all that has to be done is to move hand lever 212 to point D on quadrant 215, then lock shaft 216 in fixed relation to linkage housing 206 by turning screw 225, and then turning screw element 253 to connect arms 248 and 250 for simultaneous movement in response to movements of the hand lever. And it should now be obvious that apparatus embodying the invention affords means for selectively obtaining automatic draft regulation or a simultaneous or successive raising or lowering of implements, for selectively varying the rate of lifting or lowering such implements, for selectively positioning and holding one or more implements, as desired, and/or for effecting increment adjustment of implement position. In addition, it should also be obvious that although the various regulations have been described with particular reference to front and rear mounted implements, the system is applicable for similarly regulating operation of any tractor propelled implement or implements, and that one or more ram units may be connected in upstream and/or downstream relation to valve 232, as desired.

And it should therefore be understood that it is not intended to limit the invention to the exact constructions and combinations herein shown and described for purposes of illustration as various modifications within the scope of the appended claims may occur to persons skilled in the art.

It is claimed and desired to secure by Letters Patent:

1. In combination, a tractor including a power source, a ground working implement operatively connected with said tractor through a raft structure including a portion movable in response to variations in implement induced draft force imparted thereto, a lift mechanism operatively connected with said implement and including a powered device for varying the vertical position of the implement throughout a predetermined range of movement, a power transmitting means for controllably connecting said powered device with said source, said power transmitting means including a part operatively associated with said portion and controllably shifting position in response to movements of the latter, a lever operatively connected with said part for selectively varying the position of said part relative to said portion, means operatively connected with said portion and rendering movements of same ineffective to control the position of said part, and additional means for controlling said powered device including an element connectable with said lever and movable thereby to a position rendering said powered device effective to hold said implement in any selected position throughout its range of movement.

2. In combination, a tractor including a power source, a ground working implement operatively connected with said tractor through a draft structure including a portion movable in response to variations in implement induced draft force imparted thereto, a lift mechanism operatively connected with said implement and including a powered device for raising and lowering same, a power transmitting means for controllably connecting said powered device with said source, said power transmitting means including a part operatively associated with said portion and controllably shifting position in response to movements of the latter, a lever operatively connected with said part for selectively varying the position of said part relative to said portion, a first means operatively connected with said portion and positionable to render movements of said portion ineffective to control the position of said part, a second means for controlling said powered device including an element connectable with said lever and movable thereby to a position rendering said powered device effective to hold said implement in any selected position throughout its range of movement, and additional means rendering said element connectable with said lever only when the latter is in its implement lowering position.

3. In combination, a tractor including a power source, a ground working implement operatively connected with said tractor through a draft structure including a portion movable in response to variations in implement induced draft force imparted thereto, a lift mechanism operatively connected with said implement and including a powered device for varying the vertical position of the implement throughout a predetermined range of movement, a power transmitting means for controllably connecting said powered device with said source, said power transmitting means including a part operatively associated with said portion and controllably shifting position in response of movements of the latter, a lever operatively connected with said part for selectively varying the position of said part relative to said portion, means operatively connected with said portion and rendering movements of same ineffective to control the position of said part, a second means for controlling said powered device including an element connectable with said lever and movable thereby to a position rendering said powered device effective to hold said implement in any selected position throughout its range of movement, and additional means co-acting with said element to impart a position indicating force reaction thereon whenever said element is positioned to hold said implement in a selected position.

4. In combination, a tractor including a power source, a ground working implement operatively connected with said tractor through a draft structure including a portion movable in response to variations in implement induced draft force imparted thereto, a hydraulic ram unit operatively connected with said implement to vary the position of same throughout a predetermined range of movement, a source of fluid, a hydraulic pump operatively associated with said power source and communicating with said fluid source and ram unit for supplying pressure fluid to the latter, said pump including a valve for controlling the flow of fluid between said pump and said ram unit, said valve being operatively associated with said draft structure portion and controllably shifting position in response to movements of said portion, a lever operatively connected with said valve for selectively varying the position of same, a first means operatively connected with said portion and rendering movements of same ineffective to control the position of said valve, and additional means for controlling said ram unit including an element connectable with said lever and movable thereby to a position rendering said ram unit effective to hold said implement in any selected position throughout its range of movement.

5. In combination, a tractor including a power source, a ground working implement operatively connected with said tractor through a draft structure including a portion movable in response to variations in implement induced draft force imparted thereto, a hydraulic ram unit operatively connected with said implement to raise or lower same, a source of fluid, a hydraulic pump operatively associated with said power source and communicating with said fluid source and ram unit for supplying pressure fluid to the latter, said pump including a valve for controlling the flow of fluid between said pump and said ram unit, said valve being operatively associated with said draft structure portion and controllably shifting position in response to movements of said portion, a lever operatively connected with said valve and with said portion for automatically maintaining a depth of implement soil penetration conforming with the position of said lever, a first means operatively connected with said portion and rendering movements of same ineffective to control the position of said valve, and additional means for controlling said ram unit including an element connectable with said lever and movable thereby to a position rendering said ram unit effective to hold said implement in any selected position throughout its range of movement only after said valve means has been moved to its implement lowering position.

6. In combination, a tractor including a power source, a plurality of ground working implements operatively connected with said tractor through a draft structure including a portion movable in response to implement induced draft force imparted thereto, a lift mechanism operatively connected with said implements and including a powered device for varying the vertical position of each of said implements throughout a predetermined range of movement, a power transmitting means for controllably connecting said powered devices with said source, said power transmitting means including a part operatively associated with said portion of the draft structure and controllably shifting position in response to movements of the latter, a lever operatively connected with said part and with said portion for automatically maintaining a depth of implement soil penetration conforming with the position of said lever, a first means operatively connected with said portion and rendering movements of same ineffective to control the position of said part, and additional means controlling at least one of said powered devices and including an element adjustable to afford either a simultaneous or sequential movement of said powered devices.

7. In combination, a tractor including a power source, a plurality of ground working implements operatively connected with said tractor through a draft structure including a portion movable in response to variations in implement induced draft force imparted thereto, a hydraulic ram unit operatively connected with each of said implements for raising and lowering same, a source of fluid, a hydraulic pump operatively associated with said power source and communicating with said fluid source and ram units for supplying pressure fluid to the latter, said pump including a valve for controlling the flow of fluid between said pump and said ram units, said valve being operatively associated with said draft structure portion and controllably shifting position in response to movements of said portion, a lever operatively connected with said valve and with said portion for automatically maintaining a depth of implement soil penetration conforming with the position of said lever, a first means operatively connected with said portion and rendering movements of same ineffective to control the position of said valve, and additional means for controlling at least one of said ram units and including an element adjustable to afford either a sequential or a simultaneous raising of said implements, as desired, in response to movement of said lever into an implement lifting position.

8. In combination, a tractor including a power source, a plurality of ground working implements operatively connected with said tractor through a draft structure including a portion movable in response to implement induced draft force imparted thereto, a lift mechanism operatively connected with said implements and including a powered device for raising and lowering same, a power transmitting means for controllably connecting said powered devices with said source, said power transmitting means including a part operatively associated with said portion of the draft structure and controllably shifting position in response to movements of the latter, a lever operatively connected with said part and with said portion for automatically maintaining a depth of implement soil penetration conforming with the position of said lever, a first means operatively connected with said portion and rendering movements of same ineffective to control the position of said part, and an additional means for controlling at least one of said powered devices including a first element adjustable to afford either a sequential or a simultaneous raising of said implements and including a second element operably connectable with said lever and coacting with said part of said power transmitting means to effect, depending on the position of said lever, either a simultaneous or a sequential lowering of said implements.

9. The combination set forth in claim 8, wherein said additional means includes structure rendering said second element connectable with said lever only when the latter is in its implement lowering position.

10. The combination set forth in claim 8, in which said additional means includes structure coacting with said lever to impart a position indicating force reaction thereon whenever said second element is positioned to effect a sequential lowering of said implements.

11. In combination, a tractor, a ground working implement operatively connected with said tractor through a draft structure including a portion movable in response to variations in implement induced draft force imparted thereto, power lift apparatus operatively connected with said implement and comprising, a source of fluid, a hydraulic pump receiving fluid from said source and operated by power derived from said tractor, a ram unit receiving fluid from said pump and operatively connected with said implement to raise or lower same, and comprising a valve selectively positionable to control the flow of fluid to and from said ram and shifting position in response to movement of said portion of said draft structure, a lever controllably associated with said valve and operatively connected with said draft structure portion for automatically maintaining a depth of implement soil penetration conforming with the position of said lever, a first means associated with said portion of the draft structure for selectively rendering same ineffective to shift the position of said valve, and a further control for said ram unit comprising a second valve controlling the withdrawal of fluid from said ram unit, and a valve control element operatively associated with said second valve and being connectable with said lever for actuation thereby, said valve control element responding to movements of said lever when connected therewith and being operative as said lever is moved to its implement lowering position to actuate said second valve for effecting withdrawal of fluid from said ram unit only after said first mentioned valve has been moved to a position permitting fluid to flow from said ram to said source.

12. The combination as set forth in claim 11, in which said further control also includes a positioned indicating means for said valve control element coacting with said lever to impart a position indicating force reaction thereon whenever said first valve is in a position to permit fluid to flow from said ram to said source and said valve control element is about to move said second valve to effect withdrawal of fluid from said ram unit.

13. The combination as set forth in claim 11, in which said further control comprises parts rendering said element connectable with said lever only when both said element and said lever are in a position such that both valve means are positioned to effect a lowering of the implement.

14. In combination, a tractor, a ground working implement operatively connected with said tractor through a draft structure including a portion movable in response to variations in implement induced draft force imparted thereto, power lift apparatus operatively connected with said implement and comprising, a source of fluid, a hydraulic pump receiving fluid from said source and operated by power derived from said tractor, a ram unit receiving fluid from said pump and operatively connected with said implement to vary the position of same, and comprising a first valve selectively positionable to control the flow of fluid to and from said ram unit and shifting position in response to movement of said portion of said draft structure, a lever controllably associated with said valve and operatively connected with said draft structure portion for automatically maintaining a depth of implement soil penetration conforming with the position of said lever, a first means associated with said portion of the draft structure for selectively rendering same ineffective to shift the position of said first valve, and a further control for said ram unit comprising a second valve controlling the return of fluid from said ram unit to said source, and a valve control element operatively associated with said second valve and being connectable with said lever for actuation thereby, said valve control element responding to movements of said lever when connected therwith and being operative through manipulation of said lever and in conjunction with said first valve to hold said implement in any selected position.

15. In combination, a tractor, plurality of ground working implements operatively connected with said tractor through a draft structure including a portion movable in response to implement induced draft force imparted thereto, a power lift means operatively associated with said implements and comprising, a source of fluid, a pump receiving fluid from said source and operated by power derived from said tractor, a plurality of ram units receiving fluid from said pump and operatively connected with said implements to raise and lower same, and comprising a valve selectively positionable to control the flow of fluid to and from said ram units, said valve being operatively associated with said portion of said draft structure and shifting position in response to movement of said portion, a lever controllably associated with said valve and operatively connected with said draft structure portion for automatically maintaining a depth of implement soil penetration conforming with the position of said lever, a first means associated with said portion of the draft structure for selectively rendering same ineffective to shift the position of said valve, and a further control for said power lift comprising a second valve controlling the flow of fluid to and from one of said ram units and being adjustably biased so that fluid delivered from said pump may enter all of said ram units substantially simultaneously or may enter the ram unit on the downstream side of said second valve only after the ram unit on the upstream side of said second valve has about completed its power stroke, and comprising a valve control element operatively associated with said second valve and being connectable with said lever for actuation thereby, said valve control element responding to movements of said lever when connected therewith and being operative through manipulation of said lever and in conjunction with said first valve to effect, as desired, either a simultaneous or sequential implement lowering movement of said ram units.

16. In combination, a tractor, a plurality of ground working implements operatively connected with said tractor through a draft structure including a portion movable in response to implement induced draft force imparted thereto, power lift means operatively associated with said implements and comprising, a source of fluid, a plurality of pumping elements receiving fluid from said source and operated by power derived from said tractor, a plurality of ram units receiving pressure fluid from said pumping elements and operatively connected with said implements to vary the position of same, and comprising a valve operatively associated with said portion of said draft structure and shifting position in response to movement of said portion, said valve being selectively positionable to place the discharge side of said pumping elements in communication with said ram units or in communication with said source, as desired, and when positioned to place the discharge side of all pumping elements in communication with said source being further movable to a position wherein fluid may return to said source from said ram units, a lever controllably associated with said valve and operatively connected with said portion of the draft structure for automatically maintaining a depth of implement soil penetration conforming with the position of said lever, a first means associated with said portion of the draft structure for selectively rendering same ineffective to shaft the position of said valve, and a further control for said power lift means comprising a second valve controlling the flow of fluid to and from one of said ram units and being adjustably biased so that fluid delivered from said pumping elements may enter all of said ram units substantially simultaneously or may enter the ram unit on the downstream side of said second valve only after the ram unit or units on the upstream side of said second valve have about completed their power stroke and comprising a valve control element operatively associated with said second valve and being connectable with said lever for actuation thereby, said valve control element responding to movements of said lever when connected therewith and being operative to place said second valve in a position for return of fluid to said source from the ram unit or units controlled thereby only after said lever has effected said further movement of said first mentioned valve.

17. The combination set forth in claim 16, in which power lift means includes a valve travel control part adjustable to selectively vary the maximum number of pumping elements that can be placed in communication with said ram units by actuation of said lever.

18. In combination, a tractor, a plurality of ground working implements operatively connected with said tractor through a draft structure including a portion movable in response to implement induced draft force imparted thereto, power lift means comprising a source of fluid, a plurality of pumping elements receiving fluid from said source, a plurality of ram units operatively connected with said implements to vary the position of same, passage means connecting the discharge side of said pumping elements with said source and with said ram units, a valve operatively associated with said portion of the draft structure and shifting position in response to movement thereof, said valve being positionable to place the discharge side of all of said pumping elements in communication with either said source or said ram units, as desired, and when positioned to place the discharge side of all pumping elements in communication with said source being further movable to a position wherein fluid may return to said source from said ram units, and said valve being also positionable to place the discharge side of some pumping elements in communication with said source and the discharge side of the other pumping elements in communication with said ram units, and comprising a pressure relief means including a fluid return passage connected with said first mentioned passage means intermediate said valve and said ram units and including a part operative in response to attainment of a predetermined high pressure to initially open said return passage and move said valve to a pump unloading position wherein said ram units receive fluid from the discharge side of only one of said pumping elements, said part then responding to a low pressure and thereby operating to maintain said return passage open and retain said valve in its pump unloading position, a lever controllably associated with said valve and operatively connected with said portion of the draft structure for automatically maintaining a depth of implement soil penetration conforming with the position of said lever, a first means associated with said portion of the draft structure for selectively rendering same ineffective to shift the position of said valve, and a further control for said power lift means comprising a second valve controlling the flow of fluid to and from one of said ram units and being adjustably biased so that fluid delivered from said pumping elements may enter all of said ram units substantially simultaneously or may enter said one ram unit on the downstream side of said second valve at a pressure less than said predetermined high pressure and only after the ram unit or units on the upstream side of said valve have about completed their power stroke, and comprising a valve control element operatively associated with said second valve and being connectable with said lever for actuation thereby, said valve control element responding to movements of said lever when connected therewith and being operative to place said second valve in a position for return of fluid to said source from said one ram unit only after said lever has effected said further movement of said first mentioned valve.

19. In combination with a tractor having a plurality of ground working implements operatively connected with said tractor through a draft structure including a portion movable in response to implement induced draft force imparted thereto, a power lift means comprising a source of fluid, a plurality of pumping elements receiving fluid from said source, a plurality of ram units operatively connected with said implements to vary the position of same, passage means connecting the discharge side of said pumping elements with said source and with said ram units, a first valve selectively positionable to place the discharge sides of all said pumping elements in communication with either said source or said ram units and also positionable to place the discharge side of some pumps in communication with said source and the discharge side of the others in communication with said ram units, and a second valve controlling the admission of fluid to one of said ram units, said second valve means including a part adjustable to vary the pressure at which fluid is admitted to said one ram unit.

20. Apparatus suitable for controllably effecting movement of an agricultural implement comprising, a source of fluid, a plurality of pumping elements receiving fluid from said source, a plurality of ram units adapted for operative connection with an agricultural implement, passage means connecting the discharge side of said pumping elements with said source and with said ram units, a first valve selectively positionable to place the discharge sides of said pumping elements in communication with said source or in communication with said ram units, as desired, said valve when positioned to place the discharge side of all pumping elements in communication with said source being further movable to a position wherein fluid may return to said source from said ram units, a lever controllably associated with said first valve, a second valve controlling the admission and withdrawal of fluid from one of said ram units, and a valve control element operatively associated with said second valve and connectable with said lever for actuation thereby, said valve control element responding to movements of said lever when connected therewith and being operative to place said second valve in a position for return of fluid from said one ram unit only after said lever has effected said further movement of said first mentioned valve, and said valve control element including parts rendering it connectable with said lever only when both of said valves are positioned to effect a return of fluid from said ram units to said source.

21. The combination set forth in claim 20, wherein said second valve is adjustably biased so that liquid delivered from said pumping elements may enter all ram units substantially simultaneously or may enter said one ram unit on the downstream side of said second valve only after the ram unit or units on the upstream side have completed their power strokes.

22. Apparatus suitable for use in controlling a pressure actuated device comprising, a pump, passage means connecting the discharge side of said pump with a fluid return passage and with an outlet adapted to deliver fluid to a pressure actuated device, a valve selectively positionable to place the discharge side of said pump in communication with said return passage or in communication with said outlet, as desired, said valve when positioned to place the discharge side of said pump in communication with said return passage being further movable to a position wherein fluid may be returned through said outlet, a second valve controlling the return of fluid through said outlet, and a lever controllably associated with both of said valves through parts rendering said lever actuable to selectively position said first mentioned valve, as aforesaid, and actuable to also position said second valve for a return flow of fluid through said outlet only after said lever has effected said further movement of said first mentioned valve.

23. Apparatus suitable for use in controlling a plurality of pressure actuated devices comprising, a source of fluid, a plurality of pumping elements receiving fluid from said source, passage means connecting the discharge side of said pumping elements with said source and with a plurality of outlets suitable for connecting pressure actuated devices therewith, a valve selectively positionable to place the discharge side of said pumping elements in communication with said source or in communication with said outlets, as desired, said valve when positioned to place the discharge sides of all pumping elements in communication with said source being further movable to a position wherein fluid may be returned through said outlets to said source, a lever controllably associated with said valve, a second valve controlling the return of fluid through one of said outlets, and a valve control element operatively associated with said second valve and connectable with said lever for actuation thereby, said valve control element responding to movements of said lever when connected therewith and being operative to place said second valve in a position for a return flow of fluid through said one outlet only after said lever has effected said further movement of said first mentioned valve, said valve control element including parts rendering it connectable with said lever only when both of said valves are positioned to effect a return flow of fluid through said outlets.

24. The combination set forth in claim 23, wherein a control part is associated with said first mentioned valve to selectively vary the number of pumping elements that can be connected in fluid delivering relation to said outlets, and wherein said second valve is adjustably biased so that fluid delivered from said pumping elements may flow through all of said outlets substantially simultaneously or may flow through said one outlet on the downstream side of said second valve only after attaining a predetermined high pressure.

25. A hydraulic apparatus suitable for use in controlling a plurality of pressure actuated devices comprising, a source of fluid, a plurality of pumping elements receiving fluid from said source, passage means connecting the discharge side of said pumping elements with said source and with a plurality of outlets suitable for connecting pressure actuated devices therewith, a valve selectively positionable to place the discharge side of said pumping elements in communication with said source or in communication with said outlets, as desired, said valve when positioned to place the discharge sides of all pumping elements in communication with said source being further movable to a position wherein fluid may be returned through said outlets to said source, a pressure relief means including a fluid return passage connected with said first mentioned passage means intermediate said valve and said outlets and including a part operatively associated with said valve and responsive to attainment of a predetermined high pressure to initially open said return passage and move said valve to a pump unloading position wherein only one of said pumping elements is delivering fluid to said outlets, a second valve controlling the return of fluid through one of said outlets, and a lever controllably associated with both of said valves and with said pressure relief part and actuable to position said second valve for a return flow of fluid through said one outlet only after the lever has effected said further movement of said first mentioned valve.

26. The combination set forth in claim 25, in which said apparatus includes additional parts adjustably biasing said second valve so that fluid delivered from said pumping elements may flow through all of said outlets substantially simultaneously or may flow through said one outlet on the downstream side of said second valve only after attainment of a pressure somewhat less than said predetermined high pressure.

27. The combination set forth in claim 25, in which said apparatus includes a control part operatively associated with said first mentioned valve and adjustable to selectively vary the number of pumping elements that can be connected in fluid delivering relation to said outlets by actuation of said lever.

28. The combination set forth in claim 25, in which said lever is controllably associated with said valves and said pressure relief part through linkage rendering said lever actuable to selectively position said first mentioned valve, as aforesaid, and rendering said pressure relief part operative to move said first valve to its pump unloading position whenever said lever is positioned to place the discharge side of more than one pumping element in communication with said outlets and the fluid being delivered to said outlets attains said predetermined high pressure.

29. The combination set forth in claim 25, in which a valve control element is operatively associated with said second valve and connectable with said lever for actuation thereby and in which said valve control element and parts connecting same to said lever permit such connection only when both of said valve means are positioned to effect a return flow of fluid to said source.

WALTER F. STREHLOW.
CHARLES T. O'HARROW.
ROY W. JOHANSEN.

REFERENCES CITED

The following references are of record in the file of this patent:

UNITED STATES PATENTS

| Number | Name | Date |
| --- | --- | --- |
| 2,356,231 | Ferguson | Aug. 22, 1944 |
| 2,366,155 | Silver | Jan. 2, 1945 |
| 2,368,125 | Evans | Jan. 30, 1945 |
| 2,394,210 | Sherman | Feb. 5, 1946 |
| 2,405,334 | Silver | Aug. 6, 1946 |
| 2,430,597 | Acton | Nov. 11, 1947 |
| 2,449,269 | Austin | Sept. 14, 1948 |
| 2,450,270 | Court | Sept. 28, 1948 |

FOREIGN PATENTS

| Number | Country | Date |
| --- | --- | --- |
| 253,566 | Great Britain | June 14, 1926 |